Jan. 24, 1956 S. H. KAPLAN 2,732,314
CATHODE-RAY TUBE COATING
Filed May 27, 1953
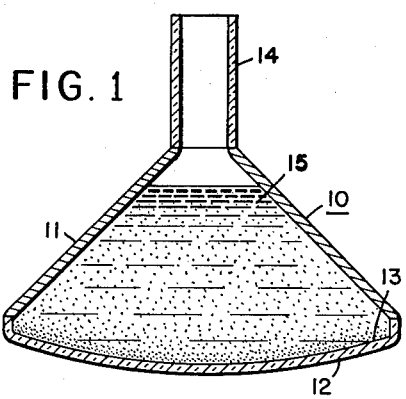
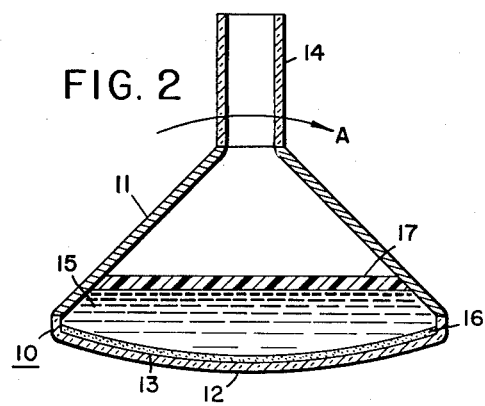
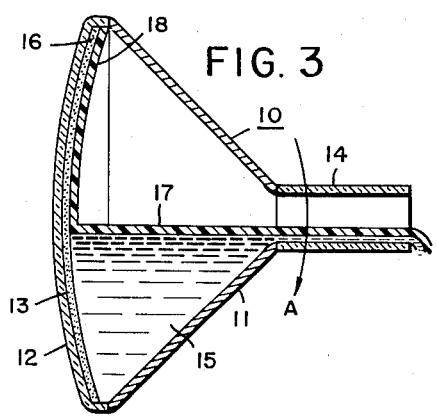
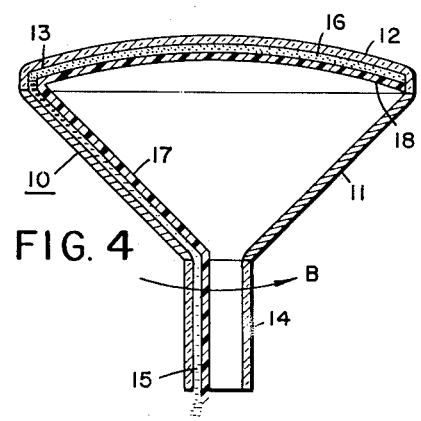
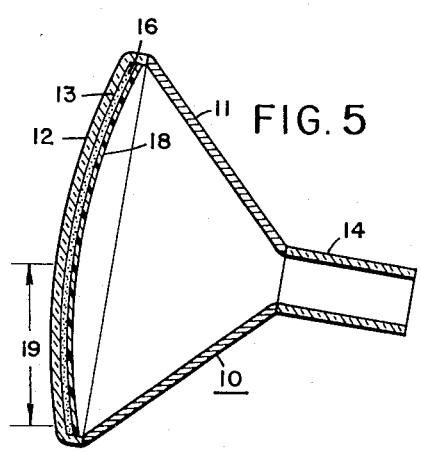
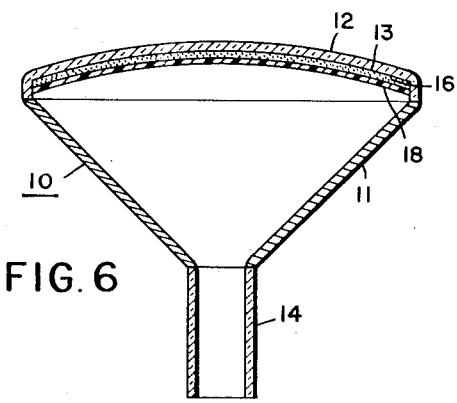
SAM H. KAPLAN
*INVENTOR.*
BY Francis W. Crotty
HIS ATTORNEY.

United States Patent Office 2,732,314
Patented Jan. 24, 1956

2,732,314

CATHODE-RAY TUBE COATING

Sam H. Kaplan, Chicago, Ill., assignor to The Rauland Corporation, a corporation of Illinois Application May 27, 1953, Serial No. 357,677

8 Claims. (Cl. 117—33.5)

This invention relates to the manufacture of cathode-ray tubes and, more particularly, to a process for filming the fluorescent screens of such tubes as an incident to the formation of electron-permeable metal-backing layers.

It is well known in the art that an electron-permeable metallic layer backing the luminescent screen of a cathode-ray tube affords numerous advantages, two of the most important of which are increased brightness and freedom from ion burn. However, a number of difficulties have been encountered in applying metal backing layers to the luminescent screen. In general, a thin volatilizable organic film is deposited upon the luminescent screen to provide a smooth continuous surface for receiving the backing layer; the backing layer is usually applied by evaporation in a vacuum, after which the organic film is volatilized by baking to leave the metallic layer in intimate contact with the screen. Most of the difficulties which have been encountered in metallizing the luminescent screens of cathode-ray tubes are attributable to imperfections or discontinuities in the organic film.

In accordance with one known process for forming a voatilizable film on the inner surface of a luminescent screen, a solution of nitrocellulose and a suitable plasticizer in an organic liquid vehicle is spread over the surface of a casting liquid, such as water, in which the screen is immersed. The solvent is permitted to evaporate so that a thin organic film solidifies on the surface of the casting liquid; subsequently, the casting liquid is decanted to deposit the solidified film on the luminescent screen.

Although the filming process described above results in a relatively smooth uniform film surface upon which the metallic backing layer may be readily deposited, it is necessary to complete the entire process of forming the luminescent screen before introducing the casting liquid employed in the formation of the organic film. Thus, in accordance with a typical commercial process for manufacturing a metal-backed luminescent screen, the luminescent screen powder is settled through a liquor or process liquid. The settling liquor is then decanted and the luminescent screen is thoroughly dried, after which the film-casting liquid is introduced and the above-described filming process is performed. The cathode-ray tube is then subjected to a second drying cycle, after which the metallic backing layer is deposited on the organic film and the film is removed by volatilization.

Obviously, the necessity of using two decanting and drying cycles to produce each metal-backed screen is both time consuming and costly. Accordingly, it has been proposed to employ a single process liquid for both screen settling and filming formation. In at least one of these prior art systems, the luminescent screen material is settled upon the face plate of a cathode-ray tube through a column of process liquid. Thereafter, a thin volatilizable organic film is formed on the surface of the process liquid and is allowed to solidify, after which the process liquid is removed from the envelope to deposit from the film upon the previously formed fluorescent screen. This method of filming has several disadvantages, most of which result from the fact that the mechanics of screen settling and film forming require liquid columns of different height. If a liquid column of sufficient height to provide a commercially acceptable uniform luminescent screen is employed, the area of the organic film formed on the surface of the process liquid is considerably smaller than that of the screen surface, due to the generally conical shape of the envelope. As a result, tearing or streaking of the organic film deposited on the screen is encountered and these defects in the film cause similar defects in the metal backing layer. The tearing or streaking effects are especially prevalent when this prior art process is applied to the manufacture of large cathode-ray tubes having an enlarged envelope portion of generally conical configuration as contrasted to tubes in which the major portion of the envelope is of generally hemispherical shape.

In another suggested filming process, the luminescent screen material is settled on the cathode-ray tube face plate, and, after the settling process has been completed, a solution of a synthetic resin or plastic and a suitable plasticizer is deposited on the surface of the process liquid. The amount of the film-forming solution is regulated so that considerably more material than that required to form a film on the screen surface is introduced into the envelope. The tube is then tilted progressively to bring the filming solution in contact with the screen; the tilting is continued to decant the process liquid and the excess of film-forming solution, after which the screen and film are dried simultaneously. However, it has been determined that the application of this filming process to the manufacture of cathode-ray tubes, especially those with a major diagonal dimension of 17 inches or greater, often results in the formation of streaks and other imperfections in the organic film.

It is an object of the present invention, therefore, to provide a new and improved method for forming a thin volatilizable organic film on the surface of the luminescent screen of a cathode-ray tube preliminary to the application of a metallic backing layer.

It is an additional object of the invention to provide a new and improved process which utilizes a common process liquid to form a luminescent screen and to deposit a thin volatilizable organic film over that screen.

In accordance with the invention, a new and improved method of forming a volatilizable organic film upon the luminescent screen of a cathode-ray tube comprises the steps of introducing a casting liquid into the envelope of the cathode-ray tube and maintaining that envelope in a first position in which the luminescent screen is substantially horizontal and in which the screen is covered by the casting liquid. A filming solution, comprising a volatilizable organic material, which is substantially immiscible with and has a lower specific gravity than the casting liquid, is deposited on the surface of the casting liquid in a quantity exceeding that required to form a film upon the screen. The cathode-ray tube envelope is then rotated in a first direction and through a preselected angle sufficient to decant substantially all of the casting liquid to form a layer of the filming solution upon the screen surface. Thereafter, the cathode-ray tube is rotated in a direction opposite to the aforementioned first direction to a second position in which the screen is approximately vertical and is retained in that second position for a predetermined period to drain any excess of the filming solution and to reduce the layer of filming solution to a relatively thin film. Finally, the film formed on the luminescent screen is dried.

Also in accordance with the invention, the screen settling and film forming operations may be performed by the use of a single process liquid. The process liquid is first introduced into a cathode-ray tube envelope and the envelope is maintained in a first position in which a selected internal surface on which the screen is to be formed is substantially horizontal; while in this position, the selected surface is covered by the process liquid. A layer of luminescent material is deposited on the selected envelope surface by settling the material through the process liquid. A filming solution, comprising a volatilizable organic material, which is substantially immiscible with and has a lower specific gravity than the processing liquid, is deposited on the surface of the process liquid and the envelope is rotated in a first direction and through a preselected angle sufficient to decant substantially all of the process liquid to form a layer of the filming solution upon the luminescent layer. Thereafter, the envelope is rotated in a direction opposite to the aforesaid first direction of rotation to a second position, in which the selected surface is approximately vertical, and is retained in that second position for a predetermined period to drain any excess filming solution from the layer so formed and thus reduce the filming solution layer to a relatively thin film. Subsequently, the film is dried.

The features of the invention which are believed to be novel are set forth with particularity in the appended claims. The organization and manner of operation of the invention, together with further objects and advantages thereof, may best be understood by reference to the following description taken in conjunction with the accompanying drawing, in which:

Figure 1 is a cross-sectional view of a cathode-ray tube envelope illustrating an initial step in the inventive process;

Figure 2 is a cross sectional view of a cathode-ray tube envelope similar to that of Figure 1 and illustrating another early step in the process of the invention;

Figure 3 illustrates a step in the process subsequent to that of Figure 2;

Figure 4 is a cross sectional view of a tube envelope showing an additional method step;

Figure 5 illustrates a critical step in the process subsequent to that shown in Figure 4; and Figure 6 shows, in cross-section, a cathode-ray tube following the formation of a volatilizable organic film in accordance with the invention.

The cathode-ray tube envelope 10 shown in cross-section in Figure 1 comprises an enlarged conical section 11, one end of which is closed by a face-plate 12 having an internal surface 13 facing the conical section. The end of cone 11 opposite face-plate 12 is sealed to a tubular neck section 14. As illustrated, neck 14 and face-plate 12 are formed of glass, whereas cone 11 is made of metal. However, it will be understood that the process of the invention is in no way restricted to a particular envelope configuration or any specific combination of envelope materials; rather, the invention is applicable to tube envelopes of widely diverse shapes formed from any suitable material.

To obtain the several advantages of the present invention, a luminescent screen covered with a thin volatilizable organic film is formed upon a selected surface of the tube envelope in the following manner. At the beginning of the screening and filming process, envelope 10 is established in a position generally corresponding to that illustrated in Figure 1, with surface 13 disposed substantially horizontally. A process liquid 15 is introduced into envelope 10; preferably, a sufficient amount of process liquid 15 is employed to fill most of conical section 11. A suspension of luminescent screen material is then introduced by spraying or pouring over the surface of process liquid 15 or in any other manner and the envelope is maintained in the position of Figure 1 for a sufficient period of time to permit the screen material to settle through the process liquid onto surface 13. Accordingly, as illustrated in Figure 2, a layer 16 of luminescent material is formed upon surface 13 of the cathode-ray tube.

After the luminescent layer has settled to surface 13, a substantial quantity of process liquid 15 is preferably removed from envelope 10 by siphoning or any other suitable method to bring the level of the process liquid closer to layer 16. A filming solution 17, comprising a volatilizable organic material, a plasticizer, and a suitable solvent, is deposited upon process liquid 15. It is necessary that the quantity of filming solution 17 employed exceed considerably the amount required to form the final film and it is also necessary that the filming solution be immiscible with liquid 15. Furthermore, the specific gravity of filming solution 17 must be less than that of process liquid 15 so that the filming solution floats upon the surface of the process liquid.

After filming solution 17 is deposited upon the process liquid, tube 10 is rotated in a first direction, as indicated by arrow A of Figure 2. The original direction selected is not critical; however, where face-plate 12 is of rectangular configuration, it is preferred that the direction of rotation be parallel to the shorted sides of the rectangle in order to expedite processing. Rotation of the tube envelope is continued until substantially all of process liquid 15 is decanted. Figure 3 illustrates an intermediate step in the rotational cycle and shows the initial formation of a layer 18 of film-forming solution 17 upon luminescent layer 16. Rotation of envelope 10 in the direction indicated by arrow A is continued until the envelope reaches the position shown in Figure 4, in which substantially all of process liquid 15 has been decanted. The angle through which envelope 10 is rotated is in part dependent upon the configuration of conicial section 11 and neck 14; usually, it is necesary to tilt the envelope through an angle of at least 120° and it may be desirable to continue the rotation through an arc of 180°. As the envelope is rotated, filming solution 17 progressively contacts substantially all of the surface of luminescent layer 16, so that filming solution layer 18 is distributed across the entire screen surface. During the decanting, envelope 10 should preferably be rotated as rapidly as possible without causing "bubbling" or other disturbances in the liquid flow; the rotation may be at a uniform rate or may be established at one rate during the initial part of the decanting, when the liquid flows out relatively rapidly with small angular changes, and subsequently increased during the final part of the decanting process.

After decanting, envelope 10 is again rotated, this time in a direction opposite to the previous rotation, as indicated by arrow B of Figure 4. Rotation in the direction of arrow B is continued until envelope 10 reaches a position in which face-plate surface 13 and its associated luminescent layer 16 and filming-solution layer 18 are substantially vertical, as shown in Figure 5. Rotational speed for this step is not critical; preferably, envelope 10 is tilted to the position of Figure 5 as rapidly as possible to preclude premature drying while still in the position of Figure 4. If the process is applied to a cathode-ray tube envelope having a face-plate of conical or spherical configuration, it is preferred that the lower or depending portion 19 of face-plate 12 be substantially vertical so that envelope 10 may actually be tilted at an angle of 5° to 40°, depending upon the radius of curvature of face-place 12. Envelope 10 is maintained in the position shown in Figure 5 for a predetermined period of time sufficient to permit any excess filming solution included in layer 18 to drain off, so that layer 18 is reduced to a thin film. Subsequently, the envelope is subjected to a drying cycle, which may be identical with any of the normal drying procedures applicable to cathode-ray tube screens. Drying of screens. Drying of screen 16 and film 18 may be effected while envelope 10 remains in the position illustrated in Figure 5; preferably, however, envelope 10 is titled to the position shown in Figure 6 before any substantial drying of film 18 occurs. Envelope 10 is placed in this position, with face-plate 12 substantially horizontal and facing upwardly, on an air drier and is dried in accordance with conventional practice, following which a metallic coating is deposited upon film 18 and the screen structure is then baked to volatilize the film.

Many of the advantages of the invention may be realized even if a common process liquid is not employed for screening and filming. Where it is desired to use separate settling and filming media, the filming process begins with the introduction of a casting liquid into a cathode-ray tube envelope in which the luminescent screen has already been formed and dried. Effectively, the filming process is started at the stage illustrated in Figure 2 and continues thereafter in exactly the same manner as described above for the combined screening and filming method. Utilization of the modified process provides a smooth even film of volatilizable material upon the surface of the previously-formed luminescent screen and effectively precludes tearing or streaking of the film.

Certain of the steps of the process described above are of primary importance with respect to the uniformity of film 18 and luminescent layer 16. For most tube configurations, it is desirable that the depth of process liquid 15, in the combined process, be sufficient to fill conical section 11 to a depth of several inches. Otherwise, luminescent layer 16 may not have sufficient "wet adherence" and may separate from surface 13 of face-plate 12 during subsequent stages of the process, forming holes, streaks and other imperfections in the screen. As indicated above, it is necessary to employ a quantity of filming solution 17 in excess of that which ultimately forms film 18, since some of the filming solution is lost during the decanting and draining procedures. In addition, effective use of the process of the invention requires that the stages illustrated in Figures 2-5 be carried out while filming solution 17, and layer 18 formed therefrom, are in a liquid state, so that substantially no drying occurs until after layer 18 has been completely formed and any excess filming solution included therein has been drained off. The time available for the filming cycle is, of course, dependent upon the quantity and composition of filming solution 17; however, even with relatively fast-drying filming compositions, adequate time is ordinarily available for performing the filming process without premature drying. The direction of rotation followed in rotating envelope 10 from the decanting position of Figure 4 to the film drying position of Figure 5, indicated by arrow B, is most important and must be opposite to the original decanting rotation shown by arrow A (Figures 2 and 3).

Merely by way of illustration, and in no sense by way of limitation, it may be desirable to set forth in detail the composition of illustrative examples of a suitable filming solution and certain other data with respect to one particular embodiment of the processing procedure.

A basic stock solution may be prepared by dissolving nitrocellulose in amyl acetate to approximately 8 percent concentration. This basic solution is then thinned to form an intermediate solution the composition of which is as follows:

Solvents:
  70% amyl acetate
  8% toluene
  18% n-hexyl acetate
  4% mesityl oxide
Nitrocellulose: 2.35 gm./100 cc. solution
Tri-phenyl phosphate: 1.53 gm./100 cc. solution The final filming solution is prepared by thinning the intermediate solution with the same solvents as are used in forming the intermediate solution and the final solution is then rolled for several hours in a ball mill and subsequently filtered. It will be appreciated that numerous filming solutions may be devised for utilization in connection with the filming process of the invention. Any of numerous cellulose derivatives may be employed, although nitrocellulose is preferred. Suitable plasticizers which may be employed instead of or in combination with tri-phenyl phosphate include dibutyl phthalate and tricresyl phosphate, among others. Many possible solvent combinations may be employed and other solvents or partial solvents such as xylene, benzene and/or ethyl alcohol may be utilized.

Processing liquid 15 preferably comprises a mixture of water and a suitable electrolyte such as barium nitrate; a suitable process liquid may be formulated by the addition of a 1.6 percent barium nitrate solution to deionized water in the volumetric ratio of 1.5 parts electrolyte to 100 parts water. The luminescent material may, of course, comprise any of the many well known suitable phosphors.

The time intervals required for the various stages of the process are subject to variation and are primarily dependent upon the dimensions and configuration of envelope 10. A typical cycle requires ten minutes to settle layer 16 after introduction of the luminescent material, approximately one minute after filming solution 17 is introduced and prior to initiation of rotation to achieve stability of the processing liquid, approximately three and one-third minutes for rotation and decanting, and approximately fifteen minutes in the draining position of Figure 5. The film and screen layers should be dried slowly where the combined filming and screening process is employed.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. The method of forming a volatilizable organic film upon the luminescent screen of a cathode-ray envelope comprising the following steps: introducing a casting liquid into said envelope; maintaining said envelope in a first position in which said screen is substantially horizontal and is covered by said casting liquid; depositing on said casting liquid a filming solution, comprising a volatilizable organic material, which is substantially immiscible with and has a lower specific gravity than said casting liquid, the quantity of said filming solution exceeding that required to form a film upon said luminescent screen; rotating said envelope in a first direction, through a preselected angle sufficient to decant substantially all of said casting liquid from said envelope to form a layer of said filming solution upon the surface of said screen; thereafter rotating said envelope in a direction opposite said first direction to a second position in which said screen is approximately vertical; retaining said envelope in said second position for a predetermined period to drain any excess of said filming solution from said layer and reduce said layer to a relatively thin film; and subsequently drying said film.

2. The method of forming a volatilizable organic film upon the luminescent screen of a cathode-ray tube envelope comprising the following steps: introducing a casting liquid into said envelope; maintaining said envelope in a first position in which said screen is substantially horizontal and is covered by said casting liquid; depositing on said casting liquid a filming solution, comprising a volatilizable organic material, which is substantially immiscible with and has a lower specific gravity than said casting liquid, the quantity of said filming solution exceeding that required to form a film upon said luminescent screen; rotating said envelope in a first direction, through a preselected angle sufficient to decant substantially all of said casting liquid from said envelope, to form a layer of said filming solution upon the surface of said screen; thereafter rotating said envelope in a direction opposite said first direction to a second position in which said screen is approximately vertical; retaining said envelope in said second position for a predetermined period, and subsequently rotating said envelope to a drying postion, in which said screen is substantially horizontal, before any substantial drying of said filming-solution layer occurs.

3. The method of forming a luminescent screen upon a selected internal surface of a cathode-ray tube envelope comprising the following steps: introducing a process liquid into said envelope; maintaining said envelope in a first position in which said surface is substantially horizontal and is covered by said process liquid; depositing a layer of luminescent material on said surface by settling said luminescent material through said process liquid; depositing on said process liquid a filming solution, comprising a volatilizable organic material, which is substantially immiscible with and has a lower specific gravity than said process liquid, the quantity of said filming solution exceeding that required to form a film upon said layer of luminescent material; rotating said envelope in a first direction, through a preselected angle sufficient to decant substantially all of said process liquid from said envelope, to form a layer of said filming solution upon said luminescent layer; thereafter rotating said envelope in a direction opposite said first direction to a second position in which said surface is approximately vertical; retaining said envelope in said second position for a predetermined period to drain any excess of said filming solution from said filming-solution layer and reduce said filming-solution layer to a relatively thin film; and subsequently drying said film.

4. The method of forming a luminescent screen upon a selected internal surface of a cathode-ray tube envelope comprising the following steps: introducing a process liquid into said envelope; maintaining said envelope in a first position in which said surface is substantially horizontal and is covered by said process liquid; depositing a layer of luminescent material on said surface by settling said luminescent material through said process liquid; depositing on said process liquid a filming solution, comprising a volatilizable organic material, which is substantially immiscible with and has a lower specific gravity than said processing liquid, the quantity of said filming solution exceeding that required to form a film upon said layer of luminescent material; rotating said envelope in a first direction, through a preselected angle sufficient to decant substantially all of said process liquid from said envelope, to form a layer of said filming solution upon said luminescent layer; thereafter rotating said envelope in a direction opposite said first direction to a second position in which said surface is approximately vertical; retaining said envelope in said second position for a predetermined period; and subsequently rotating said envelope to a drying position, in which said surface is substantially horizontal, before any substantial drying of said filming-solution layer occurs.

5. The method of forming a luminescent screen upon a selected internal face-plate surface of a cathode-ray tube envelope comprising a neck section, an enlarged body section, and a face-plate, said method comprising the following steps: introducing a process liquid into said envelope in a quantity sufficient to fill a major portion of said enlarged body section; maintaining said envelope in a first position in which said surface is substantially horizontal and is covered by said process liquid; depositing a layer of luminescent material on said surface by settling said luminescent material through said process liquid; depositing on said process liquid a filming solution, comprising a volatilizable organic material, which is substantially immiscible with and has a lower specific gravity than said processing liquid, the quantity of said filming solution exceeding that required to form a film upon said layer of luminescent material; rotating said envelope in a first direction, through a preselected angle sufficient to decant substantially all of said process liquid from said envelope, to form a layer of said filming solution upon said luminescent layer; thereafter rotating said envelope in a direction opposite said first direction to a second position in which said surface is approximately vertical; retaining said envelope in said second position for a predetermined period to drain any excess of said filming solution from said filming-solution layer and reduce said filming solution layer to a relatively thin film; and subsequently drying said film.

6. The method of forming a luminescent screen upon a selected internal face-plate surface of a cathode-ray tube envelope comprising a neck section, an enlarged body section, and a face-plate, said method comprising the following steps: introducing a process liquid into said envelope in a quantity sufficient to fill a major portion of said enlarged body section; maintaining said envelope in a first position in which said surface is substantially horizontal and is covered by said process liquid; depositing a layer of luminescent material on said surface by settling said luminescent material through said process liquid; removing a substantial portion of said process liquid from said envelope; depositing on the remaining portion of said process liquid a filming solution, comprising a volatilizable organic material, which is substantially immiscible with and has a lower specific gravity than said processing liquid, the quantity of said filming solution exceeding that required to form a film upon said layer of luminescent material; rotating said envelope in a first direction, through a preselected angle sufficient to decant substantially all of said process liquid from said envelope, to form a layer of said filming solution upon said luminescent layer; thereafter rotating said envelope in a direction opposite said first direction to a second position in which said surface is approximately vertical; retaining said envelope in said second position for a predetermined period to drain any excess of said filming solution from said filming-solution layer and reduce said filming-solution layer to a relatively thin film; and subsequently drying said film.

7. The method of forming a luminescent screen upon a selected internal surface of a cathode-ray tube envelope comprising the following steps: introducing a process liquid into said envelope; maintaining said envelope in a first position in which said surface is substantially horizontal and is covered by said process liquid; depositing a layer of luminescent material on said surface by settling said luminescent material through said process liquid; depositing on said process liquid a filming solution, comprising a volatilizable organic material, which is substantially immiscible with and has a lower specific gravity than said processing liquid, the quantity of said filming solution exceeding that required to form a film upon said layer of luminescent material; rotating said envelope in a first direction, through a preselected angle of at least 120 degrees and sufficient to decant substantially all of said process liquid from said envelope, to form a layer of said filming solution upon said luminescent layer; thereafter rotating said envelope in a direction opposite to said first direction to a second position in which said surface is approximately vertical; retaining said envelope in said second position for a predetermined period to drain any excess of said filming solution from said layer and reduce said layer to a relatively thin film; and subsequently drying said film.

8. The method of forming a luminescent screen upon a selected internal face-plate surface of a cathode-ray tube envelope comprising a neck section and an enlarged body section having a common axis and a face-plate of regular curvilinear configuration substantially perpendicular to said axis, said method comprising the following steps: introducing a process liquid into said envelope; maintaining said envelope in a first position in which said surface is substantially horizontal and is covered by said process liquid; depositing a layer of luminescent material on said surface by settling said luminescent material through said process liquid; depositing on said process liquid a filming solution, comprising a volatilizable organic material which is substantially immiscible with and has a lower specific gravity than said processing liquid, the quantity of said filming solution exceeding that required to form a film upon said layer of luminescent material; rotating said envelope in a first direction, through a preselected angle sufficient to decant substantially all of said process liquid from said envelope, to form a layer of said filming solution upon said luminescent layer; thereafter rotating said envelope in a direction opposite to said first direction to a second position in which the depending portion of said surface is approximately vertical and said axis of said tube envelope is inclined at an angle of 5 to 40 degrees from the horizontal; retaining said envelope in said second position for a predetermined period to drain any excess of said filming solution from said layer and reduce said layer to a relatively thin film; and subsequently drying said film.

References Cited in the file of this patent

UNITED STATES PATENTS 2,616,816   De Gier et al. _____ Nov. 4, 1952